(12) United States Patent
Koeten

(10) Patent No.: US 10,095,768 B2
(45) Date of Patent: Oct. 9, 2018

(54) SYSTEMS AND METHODS FOR AGGREGATING INFORMATION-ASSET CLASSIFICATIONS

(71) Applicant: Veritas Technologies LLC, Mountain View, CA (US)

(72) Inventor: Robert Koeten, Menlo Park, CA (US)

(73) Assignee: Veritas Technologies LLC, Mountain View, CA (US)

( * ) Notice: Subject to any disclaimer, the term of this patent is extended or adjusted under 35 U.S.C. 154(b) by 581 days.

(21) Appl. No.: 14/542,165

(22) Filed: Nov. 14, 2014

(65) Prior Publication Data

US 2016/0140207 A1  May 19, 2016

(51) Int. Cl.
   *G06F 17/30* (2006.01)
(52) U.S. Cl.
   CPC .. *G06F 17/30598* (2013.01); *G06F 17/30082* (2013.01)
(58) Field of Classification Search
   CPC ......... G06F 17/30598; G06F 17/30082; G06F 11/14
   USPC ....................................................... 707/737
   See application file for complete search history.

(56) References Cited

U.S. PATENT DOCUMENTS

| | | | | |
|---|---|---|---|---|
| 5,832,470 A * | 11/1998 | Morita | ................ | G06F 17/3071 |
| 6,216,134 B1 * | 4/2001 | Heckerman | ....... | G06F 17/30713 |
| | | | | 704/202 |
| 6,446,061 B1 * | 9/2002 | Doerre | ................ | G06F 17/3071 |
| | | | | 707/738 |
| 6,922,696 B1 * | 7/2005 | Lincoln | ................ | G06F 21/556 |
| 7,100,195 B1 * | 8/2006 | Underwood | ............ | G06F 9/451 |
| | | | | 726/2 |
| 7,610,285 B1 * | 10/2009 | Zoellner | ........... | G06F 17/30115 |
| 8,458,186 B2 | 6/2013 | Stringham et al. | | |
| 8,682,886 B2 * | 3/2014 | Sorkin | ............. | G06F 17/30946 |
| | | | | 707/715 |
| 2001/0037324 A1 * | 11/2001 | Agrawal | ............. | G06F 17/3071 |
| 2001/0039544 A1 * | 11/2001 | Chakrabarti | ...... | G06F 17/30873 |
| 2002/0010708 A1 * | 1/2002 | McIntosh | .......... | G06F 17/30011 |
| | | | | 715/229 |
| 2006/0106782 A1 * | 5/2006 | Blumenau | ......... | G06F 17/30085 |
| 2007/0244892 A1 * | 10/2007 | Narancic | ........... | G06F 17/30569 |
| 2008/0071908 A1 | 3/2008 | Nair et al. | | |

(Continued)

OTHER PUBLICATIONS

Dourish, Paul, et al., "Extending Document Management Systems with User-Specific Active Properties", ACM Transactions on Information Systems, vol. 18, No. 2, Apr. 2000, pp. 140-170.*
Microsoft Computer Dictionary, 5th Edition, Microsoft Press, Redmond, WA, © 2002, pp. 67-68.*

(Continued)

*Primary Examiner* — Robert Stevens
(74) *Attorney, Agent, or Firm* — FisherBroyles LLP

(57) ABSTRACT

The disclosed computer-implemented method for aggregating information-asset classifications may include (1) identifying a data collection that includes two or more information assets, (2) identifying a classification for each of the information assets, (3) deriving, based at least in part on the classifications of the information assets, an aggregate classification for the data collection, and (4) associating the aggregate classification with the data collection to enable a data management system to enforce a data management policy based on the aggregate classification. Various other methods, systems, and computer-readable media are also disclosed.

20 Claims, 17 Drawing Sheets

(56) References Cited

U.S. PATENT DOCUMENTS

| | | | | |
|---|---|---|---|---|
| 2010/0146004 A1* | 6/2010 | Sim-Tang | ........... | G06F 11/1448 |
| | | | | 707/797 |
| 2010/0274750 A1* | 10/2010 | Oltean | .............. | G06F 17/30082 |
| | | | | 706/47 |
| 2010/0333116 A1* | 12/2010 | Prahlad | ............. | G06F 17/30082 |
| | | | | 719/328 |
| 2011/0113466 A1* | 5/2011 | Stringham | ........ | G06F 17/30864 |
| | | | | 726/1 |
| 2011/0131628 A1* | 6/2011 | Pfitzmann | ........... | H04L 63/1433 |
| | | | | 726/1 |
| 2014/0006244 A1 | 1/2014 | Crowley et al. | | |
| 2014/0052689 A1* | 2/2014 | Ficara | ............... | G06F 17/30174 |
| | | | | 707/610 |
| 2014/0068706 A1* | 3/2014 | Aissi | ................... | G06F 21/6254 |
| | | | | 726/1 |
| 2014/0081890 A1 | 3/2014 | Casiano | | |
| 2015/0304169 A1* | 10/2015 | Milman | .................. | G06F 21/60 |
| | | | | 709/220 |
| 2015/0347773 A1* | 12/2015 | Bonney | ............... | G06F 21/6218 |
| | | | | 726/1 |

OTHER PUBLICATIONS

Random House Webster's College Dictionary, Random House, New York, NY, Apr. 2000, pp. 25 and 1429.*

Main, Michael, et al., Data Structures & Other Objects Using C++, 2nd Edition, Addison Wesley, Boston, MA, © 2001, pp. 91-92.*

Millen, Jonathan K., et al., "Security for Object-Oriented Database Systems", RISP 1992, Oakland, CA, Aug. 6, 1992, pp. 260-272.*

* cited by examiner

SYSTEMS AND METHODS FOR AGGREGATING INFORMATION-ASSET CLASSIFICATIONS

BACKGROUND

In the digital age, organizations and other entities may manage increasingly large volumes of information assets (e.g. files, emails, etc.). Organizations may deploy various data management systems for storing, organizing, protecting, and accessing their information assets. For example, an organization may deploy a backup system that backs up the organization's information assets, an archiving system that archives the organization's information assets, and a data-loss-protection (DLP) system that protects the organization's information assets from data loss. A typical data management system may function by enforcing data management policies (e.g., backup, archive, or DLP policies) that are based on classifications that the data management system assigns to the information assets. For example, a conventional DLP system may protect information assets by enforcing a DLP policy that indicates that information assets classified by the DLP system as sensitive should not be access by certain individuals or stored to storage systems that are not secure.

Unfortunately, using conventional classification-based data management policies to manage collections of information assets may present unwanted limitations, especially when the collections include information assets with differing classifications, since conventional classification-based data management policies are generally defined based on the classifications of individual information assets. Accordingly, the instant disclosure identifies and addresses a need for additional and improved systems and methods for aggregating information-asset classifications.

SUMMARY

As will be described in greater detail below, the instant disclosure describes various systems and methods for aggregating information-asset classifications. In one example, a computer-implemented method for aggregating information-asset classifications may include (1) identifying a data collection (e.g., a set of related information assets or a container of information assets) that includes two or more information assets, (2) identifying a classification for each of the information assets, (3) deriving an aggregate classification for the data collection based at least in part on the classifications of the information assets, and (4) associating the aggregate classification with the data collection to enable a data management system to enforce a data management policy based on the aggregate classification.

In one embodiment, deriving the aggregate classification may include compiling a union of the classifications of two or more of the information assets, and the aggregate classification may include the union of the classifications of the two or more of the information assets. In one embodiment, deriving the aggregate classification may include identifying a maximum value of the classifications of two or more of the information assets, and the aggregate classification may include the maximum value of two or more of the information assets.

In one embodiment, deriving the aggregate classification may include calculating an average value of the classifications of the information assets, and the aggregate classification may include the average value of the classifications of the information assets. In one embodiment, deriving the aggregate classification may include identifying a minimum value of the classifications of the information assets, and the aggregate classification may include the minimum value of the classifications of the information assets.

In one embodiment, the computer-implemented method may further include (1) receiving a notification of a change to the data collection and (2) modifying the aggregate classification of the data collection based on the change to the data collection. In some embodiments, the change may include a change to the classification of one of the information assets included in the data collection, deletion of one of the information assets included in the data collection, and/or inclusion of an additional information asset to the data collection. In one embodiment, the computer-implemented method may further include (1) receiving a request for the aggregate classification for the data collection and (2) providing the aggregate classification for the data collection in response to receiving the request for the aggregate classification.

In one embodiment, the computer-implemented method may further include (1) identifying a data management policy that applies to the aggregate classification of the data collection and (2) enforcing the data management policy. In one embodiment, the information assets may include an information asset capable of containing at least one additional information asset. In some examples, deriving the aggregate classification for the data collection may be based at least in part on the aggregate classification of one or more subordinate data collections contained in the data collection. In some examples, deriving the aggregate classification for the data collection may be based at least in part on a classification of one or more information assets contained in a subordinate data collection contained in the data collection. In one embodiment, the classifications for the information assets may be received from two separate and distinct data management systems.

In one embodiment, a system for implementing the above-described method may include several modules stored in memory, such as (1) an identification module that identifies a data collection that may include two or more information assets, (2) a classification module that identifies a classification for each of the information assets, (3) an aggregation module that derives, based at least in part on the classifications of the information assets, an aggregate classification for the data collection, and (4) an association module that associates the aggregate classification with the data collection to enable a data management system to enforce a data management policy based on the aggregate classification. In some embodiments, the system may include at least one physical processor configured to execute the identification module, the classification module, the aggregation module, and the association module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a data collection that may include two or more information assets, (2) identify a classification for each of the information assets, (3) derive, based at least in part on the classifications of the information assets, an aggregate classification for the data collection, and (4) associate the aggregate classification with the data collection to enable a data management system to enforce a data management policy based on the aggregate classification.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
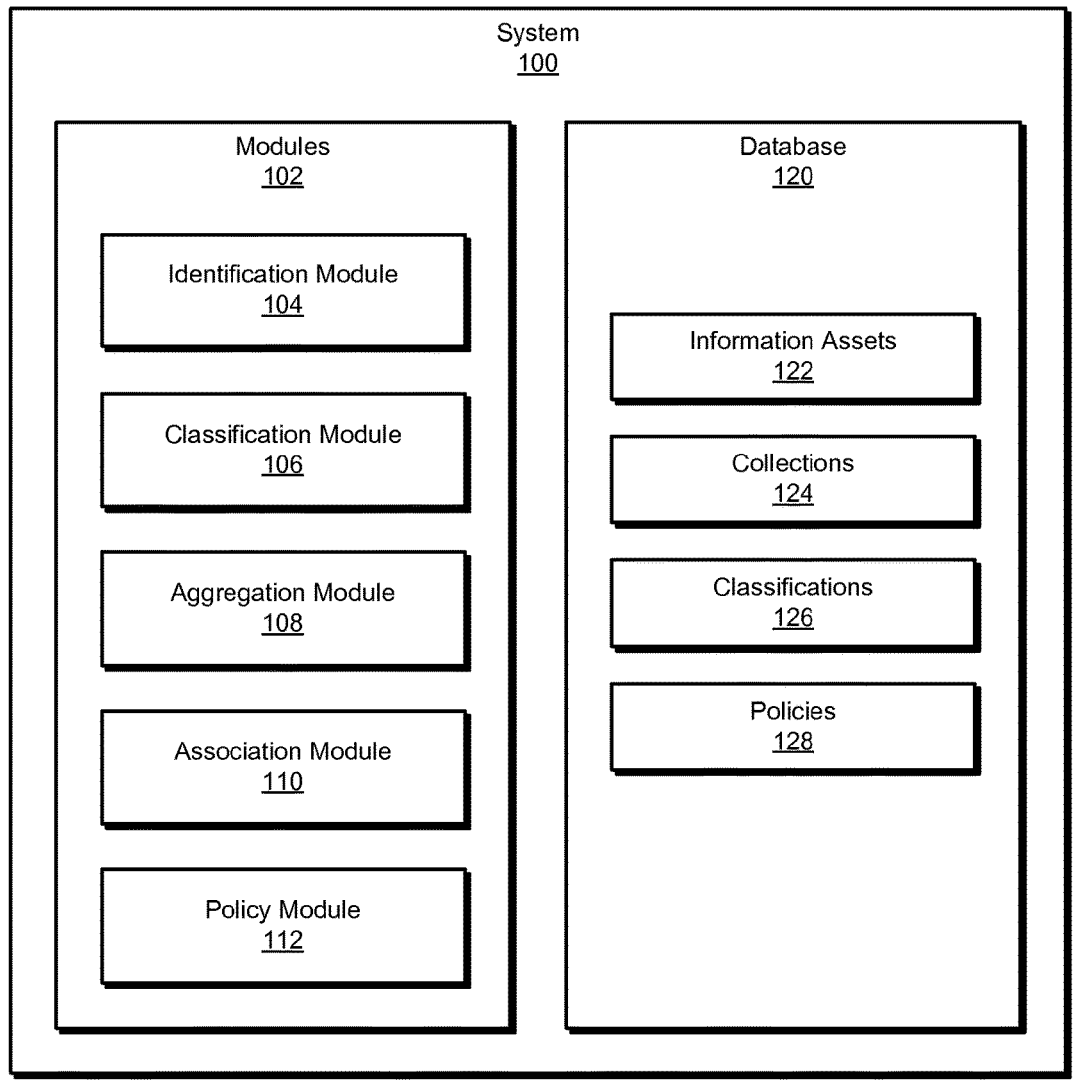
FIG. 1 is a block diagram of an exemplary system for aggregating information-asset classifications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for aggregating information-asset classifications. As will be explained in greater detail below, by aggregating the potentially differing classifications of the information assets that are included in a data collection into a single aggregate classification for the data collection, the systems and methods described herein may enable a data management system to define and/or enforce a data management policy using collection-level classifications. Moreover, by using information generated by and received from one or more separate and distinct data management systems to track what information assets are included in a data collection and how the information assets are classified, the systems and methods described herein may generate an aggregate classification for the data collection without having to independently scan the data collection or classify some or all of its information assets. Embodiments of the instant disclosure may also provide various other advantages and features, as discussed in greater detail below.

Figure 2:
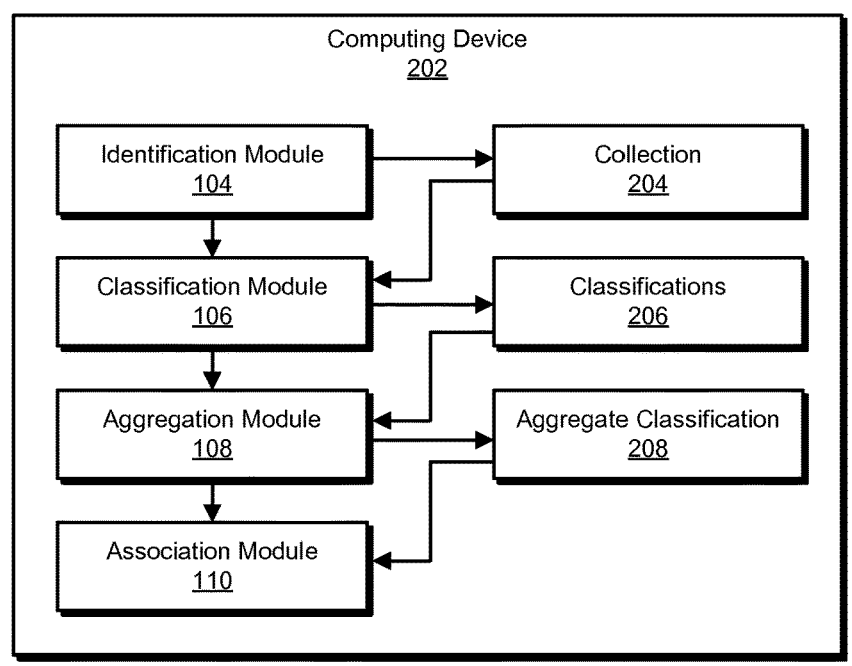
FIG. 2 is a block diagram of an additional exemplary system for aggregating information-asset classifications.
Figure 3:
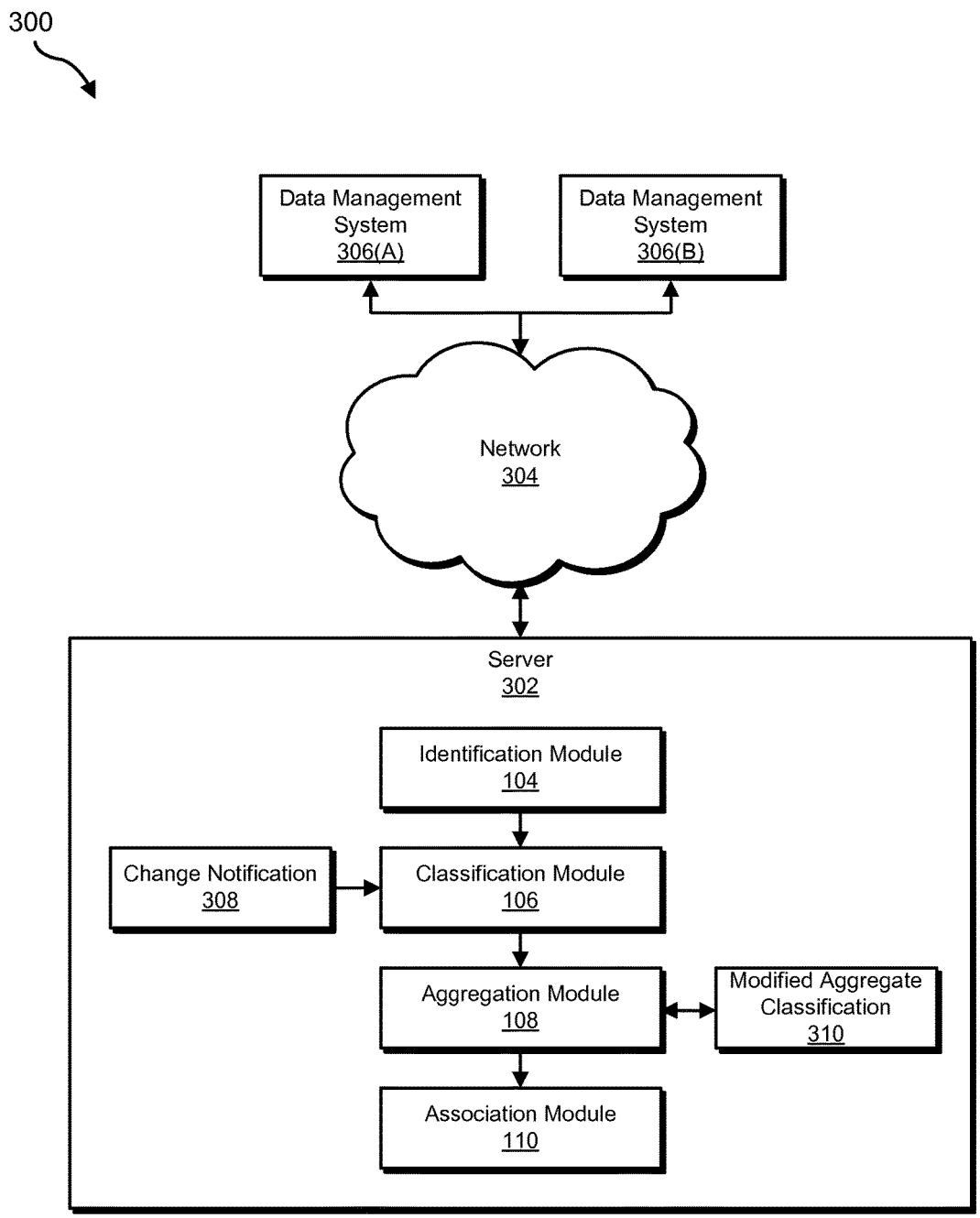
FIG. 3 is a block diagram of an additional exemplary system for aggregating information-asset classifications.

The following will provide, with reference to FIGS. 1-3, detailed descriptions of exemplary systems for aggregating information-asset classifications. Detailed descriptions of corresponding computer-implemented methods will also be provided in connection with FIGS. 4-15. In addition, detailed descriptions of an exemplary computing system and network architecture capable of implementing one or more of the embodiments described herein will be provided in connection with FIGS. 16 and 17, respectively.

FIG. 1 is a block diagram of an exemplary system 100 for aggregating information-asset classifications. As illustrated in this figure, exemplary system 100 may include one or more modules 102 for performing one or more tasks. For example, and as will be explained in greater detail below, exemplary system 100 may include an identification module 104 that may identify a data collection that includes a plurality of information assets. Exemplary system 100 may additionally include a classification module 106 that may identify a classification for each of two or more of the information assets. Exemplary system 100 may also include an aggregation module 108 that may derive, based at least in part on the classifications of the two or more of the information assets, an aggregate classification for the data collection. Exemplary system 100 may additionally include an association module 110 that may associate the aggregate classification with the data collection to enable a data management system to enforce a data management policy based on the aggregate classification. Exemplary system 100 may also include a policy module 112 that identifies a data management policy that applies to the aggregate classification of the data collection. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, server 302 in FIG. 3, computing system 1610 in FIG. 16, and/or portions of exemplary network architecture 1700 in FIG. 17. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a representation of one or more information assets, (e.g., information assets 122), a representation of one or more collections of information assets, (e.g., collections 124), classifications of one or more information assets and/or data collections (e.g., classifications 126), and/or information about one or more data management policies (e.g., policies 128). Database 120 may represent portions of a single database or computing device or a plurality of databases or computing devices. For example, database 120 may represent a portion of computing device 202 in FIG. 2, server 302 in FIG. 3, computing system 1610 in FIG. 16, and/or portions of exemplary network architecture 1700 in FIG. 17. Alternatively, database 120 in FIG. 1 may represent one or more physically separate devices capable of being accessed by a computing device, such as computing device 202 in FIG. 2, server 302 in FIG. 3, computing system 1610 in FIG. 16, and/or portions of exemplary network architecture 1700 in FIG. 17.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102 and/or may store all or a portion of the data in database 120.

Figure 5:
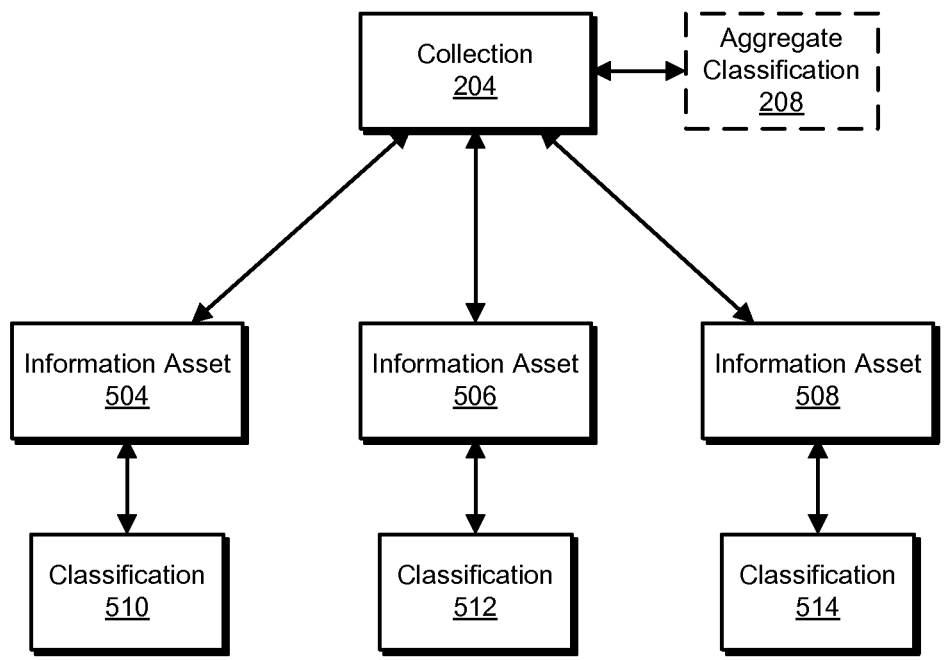
FIG. 5 is a block diagram of an exemplary data collection and associated classifications.

In one embodiment, one or more of modules 102 from FIG. 1 may, when executed by at least one processor of computing device 202, enable computing device 202 to aggregate information-asset classifications. For example, and as will be described in greater detail below, identification module 104 may identify a collection 204 that includes a plurality of information assets (e.g., information assets 504, 506, and 508 as shown in FIG. 5). Classification module 106 may identify classifications 206 (e.g., classifications 510, 512, and 514 in FIG. 5) that include a classification for each information asset included within collection 204. Aggregation module 108 may derive, based at least in part on classifications 206, an aggregate classification 208 for collection 204. Association module 110 may associate aggregate classification 208 with collection 204 to enable a data management system to enforce a data management policy based on aggregate classification 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 1610 in FIG. 16, or any other suitable computing device.

In at least one example, computing device 202 may represent a portion of a data management system. As used herein, the term "data management system" generally refers to any system or device that manages information assets and/or data collections and/or generates metadata (e.g., classifications) of information assets and/or data collections. Examples of data management systems include, without limitation, systems that protect, organize, and/or store information assets and/or data collections (e.g., file systems, email systems, document systems, storage systems, backup systems, archival systems, replication systems, high-availability systems, data-search systems, data-lifecycle-management systems, and virtualization systems) and systems that control access to information assets and/or data collections (e.g., data-loss-prevention systems, identity-authentication systems, access-control systems, encryption systems, policy-compliance systems, risk-reduction systems, intrusion-prevention systems, unstructured-data-governance systems, and electronic-discovery systems). In some examples, the term "data management system" may refer to a cloud-computing environment that provides various data-management services via the Internet.

In another example, computing device 202 may represent a portion of a system that manages a global metadata repository. As used herein, the term "global metadata repository" generally refers to any single logical repository of information-asset and/or data collection metadata that is separate and distinct from at least two data management systems that contribute and/or access the information-asset and/or data collection metadata stored in the global metadata repository. In at least one example, database 120 in FIG. 1 may represent a portion of a global metadata repository. A global metadata repository may be considered separate and distinct from two data management systems if neither of the two data management systems are necessary for the global metadata repository to function. Additionally or alternatively, a global metadata repository may be considered separate and distinct from two data management systems if failure of either of the two data management systems does not cause failure of the global metadata repository.

FIG. 3 illustrates an additional or alternative exemplary implementation of exemplary system 100 in FIG. 1. As depicted in FIG. 3, system 300 may include two data management systems 306(A) and 306(B), a server 302, and a network 304 that connects server 302 with data management systems 306(A) and 306(B). In one example, server 302 may be programmed with one or more of modules 102 and/or may store all or a portion of the data in database 120.

In one embodiment, one or more of modules 102 from FIG. 1 may, when executed by at least one processor of server 302, enable server 302 to aggregate information-asset classifications generated by data management systems 306(A) and 306(B). For example, and as will be described in greater detail below, identification module 104 may identify collection 204 that includes a plurality of information assets (e.g., information assets 504, 506, and 508 as shown in FIG. 5). Classification module 106 may identify (1) a classification for at least one information asset included within collection 204 that was generated by and received from data management system 306(A) (e.g., classification 510 for information asset 504 in FIG. 5) and (2) a classification for at least one other information asset included within collection 204 that was generated by and received from data management system 306(B) (e.g., classification 512 for information asset 506 in FIG. 5). Aggregation module 108 may derive, based at least in part on the classifications generated by and received from data management systems 306(A) and 306(B), an aggregate classification 208 for collection 204. Association module 110 may associate aggregate classification 208 with collection 204 to enable data management system 306(A) or 306(B) to enforce a data management policy based on aggregate classification 208.

Server 302 generally represents any type or form of computing device that is capable of reading computer-executable instructions and/or managing a global metadata repository. Data management systems 306(A) and 306(B) generally represent any type or form of computing device that is capable of reading computer-executable instructions and/or performing data-management operations. Examples of data management systems 306(A) and 306(B) and server 206 include, without limitation, application servers and database servers configured to provide various database services and/or run certain software applications.

Network 304 generally represents any medium or architecture capable of facilitating communication or data transfer. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1700 in FIG. 17, or the like. Network 304 may facilitate communication or data transfer using wireless or wired connections. In one embodiment, network 304 may facilitate communication between server 302 and data management systems 306(A) and 306(B).

Figure 4:
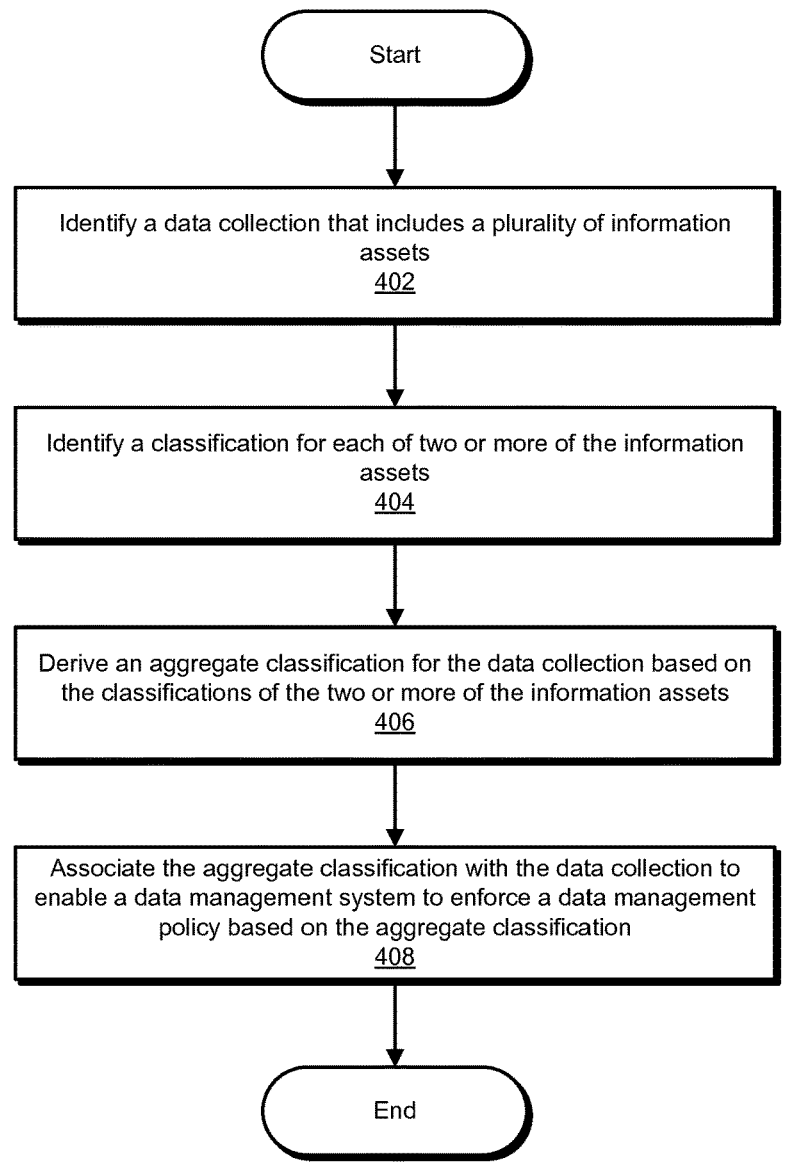
FIG. 4 is a flow diagram of an exemplary method for aggregating information-asset classifications.

FIG. 4 is a flow diagram of an exemplary computer-implemented method 400 for aggregating information-asset classifications. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 1610 in FIG. 16, and/or portions of exemplary network architecture 1700 in FIG. 17.

As illustrated in FIG. 4, at step 402, one or more of the systems described herein may identify a data collection that includes a plurality of information assets. For example, identification module 104 may, as part of computing device 202 in FIG. 2, identify collection 204 that includes information assets 504, 506, and 508 as shown in FIG. 5.

Figure 9:
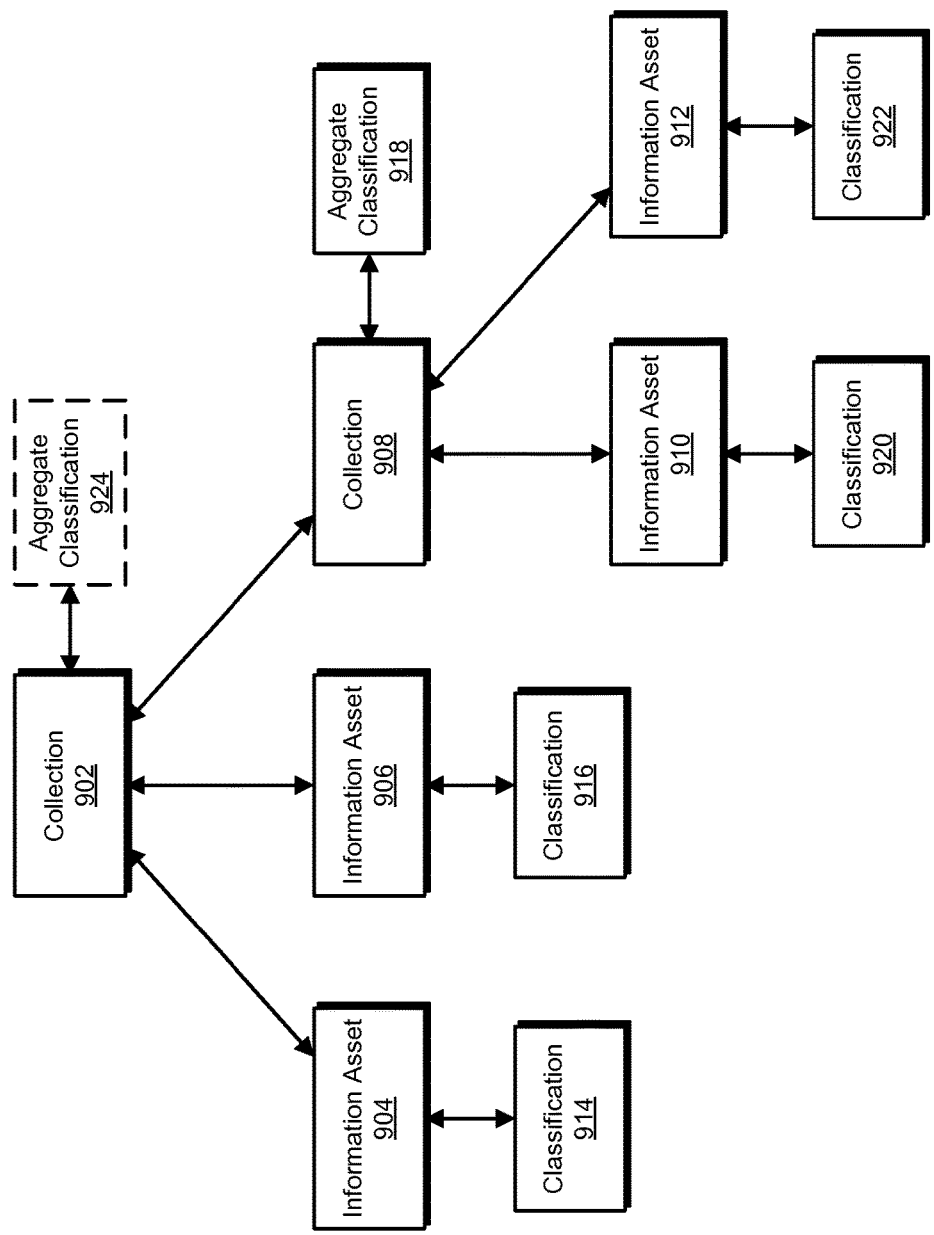
FIG. 9 is a block diagram of an exemplary data collection and associated classifications.
Figure 10:
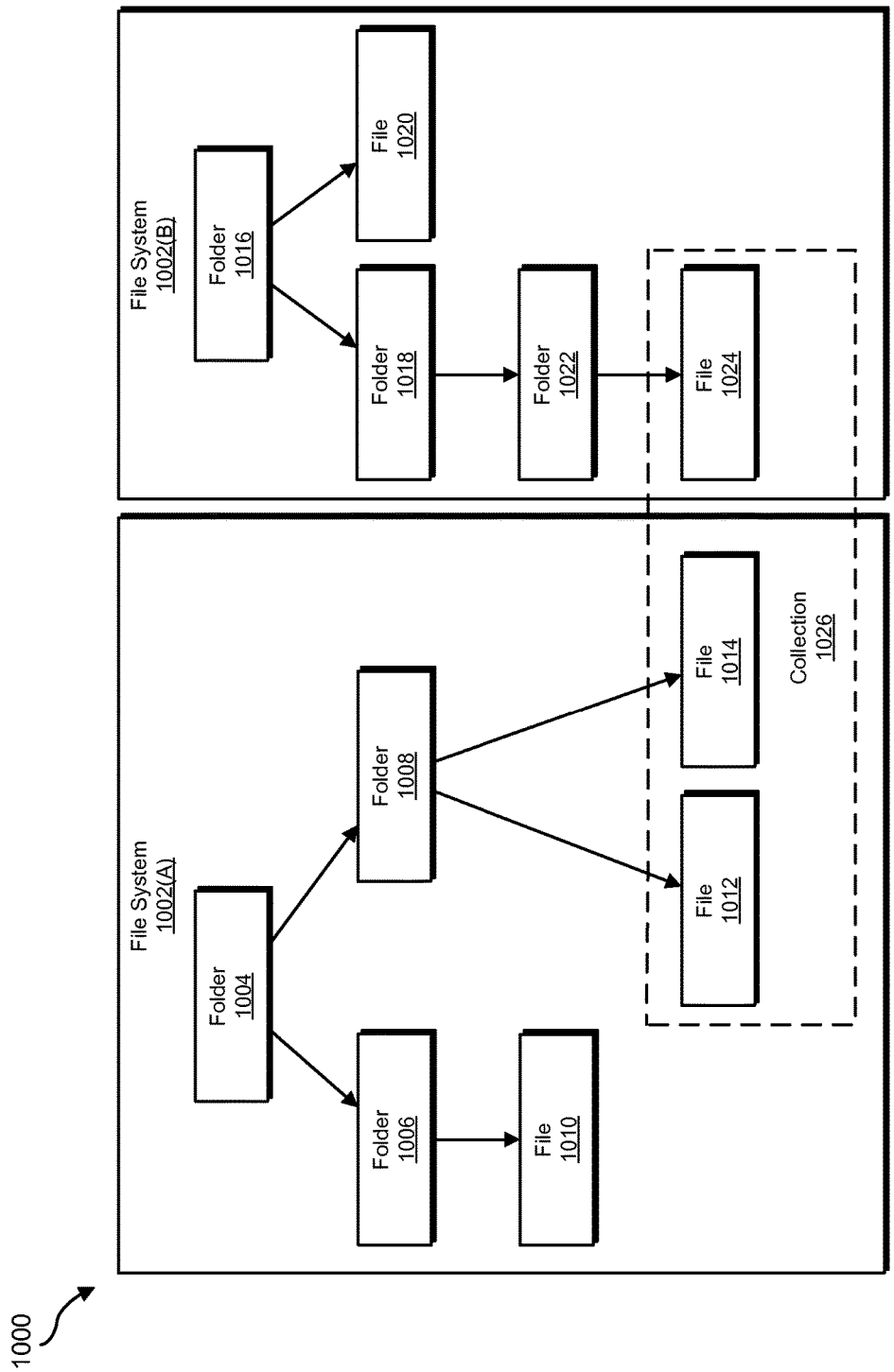
FIG. 10 is a block diagram of an exemplary data collection.
Figure 12:
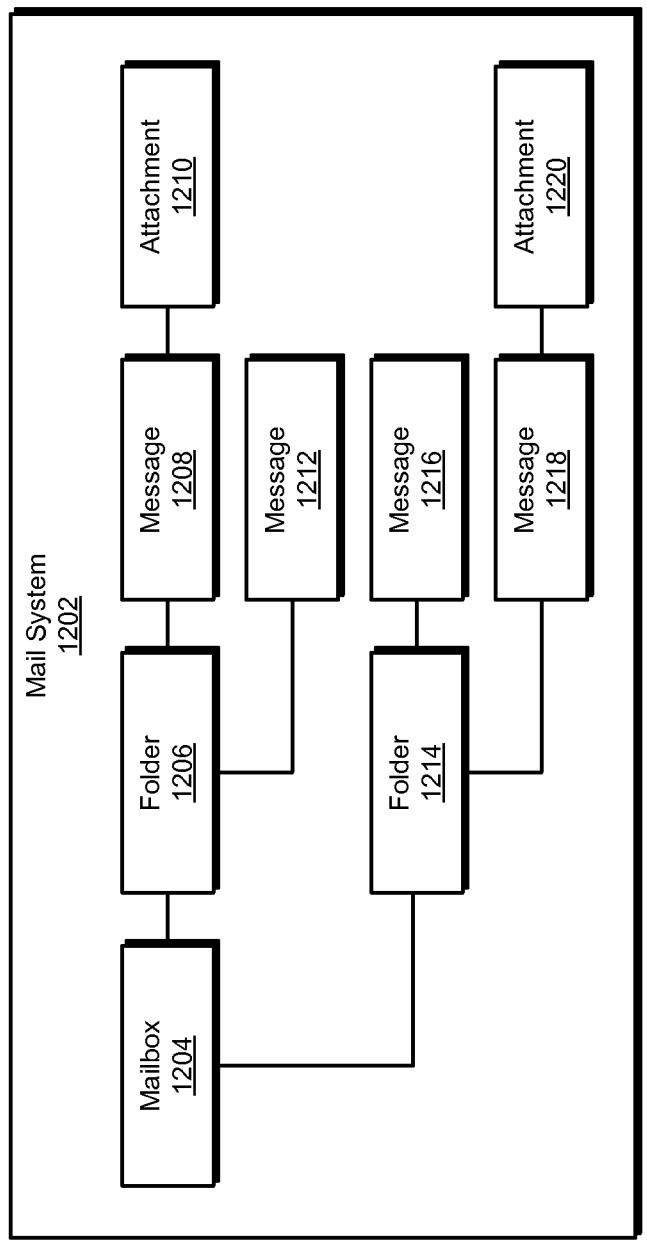
FIG. 12 is a block diagram of an exemplary data collection.
Figure 14:
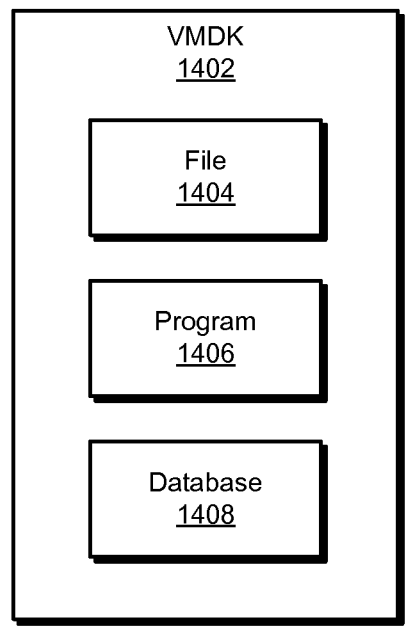
FIG. 14 is a block diagram of an exemplary data collection.

In other examples, identification module 104 may identify collection 902 in FIG. 9, collection 1026 in FIG. 10, mailbox 1204 in FIG. 12, and/or virtual machine disk file (VMDK) 1402 in FIG. 14. In these examples, collection 902 may include information assets 904 and 906 and subordinate collection 908, collection 1026 may include files 1012, 1014, and 1024 as shown in FIG. 10, mailbox 1204 may include folders 1206 and 1214, messages 1208, 1212, 1216, and 1218, and attachments 1210 and 1220 as shown in FIG. 12, and VMDK 1402 may include file 1404, program 1406, and database 1408 as shown in FIG. 14.

As used herein, the term "data collection" generally refers to any set of associated information assets. For example, the term "data collection" may refer to a set of information assets that has been defined by a data management system or an administrator. In at least one example, the term "data collection" may refer to a set of information assets that an administrator wishes to manage using a data management policy (e.g., a set of rules or conditions that indicate how or when a data management operation should be performed). In some examples, the term "data collection" may refer to a set of information assets that have similar or related attributes (e.g., similar or related content, formats, degrees of confidentiality, ownership, project or department associations, or security levels).

In some examples, the term "data collection" may refer to a container of information assets. Examples of containers of information assets include, without limitation, file-system folders or directories, archive files (such as ZIP, TAR, OR RAR files), mailboxes, mailbox folders, messages (which may include attachments), file shares, portions of content management systems (e.g., a MICROSOFT SHAREPOINT site or sub-site), virtual machine disk files (VMDKs), databases, database tables, backups, disks, database servers, or mail servers.

As used herein, the term "information asset" generally refers to any discrete or aggregated representation of electronic information. In some examples, the term "information asset" may refer to any structured, semi-structured, or unstructured information. Examples of information assets include, without limitation, files, emails, documents, messages, databases, database tables, containers, folders, backups, disks, database servers, mail servers, and mailboxes. Information assets may be stored across a variety of information-asset sources (e.g., personal computing devices, file servers, application servers, email servers, document repositories, collaboration systems, social networks, and cloud-based storage services). An information asset may be a data collection if it includes other information assets.

Returning to FIG. 4, identification module 104 may identify data collections in a variety of contexts. In one example, identification module 104 may identify data collections as part of a data management system. As part of a data management system, identification module 104 may identify data collections by scanning and/or monitoring sources of data collections and/or information assets administered by the data management system. For example, identification module 104 may identify a group of files or folders by scanning a file system on a storage device and/or may identify a mailbox or a mailbox folder by scanning a mail system. Using FIGS. 10 and 12 as examples, identification module 104 may identify folder 1004 by scanning file system 1002(A) and/or mailbox 1204 by scanning mail system 1202. As part of identifying a data collection, identification module 104 may also identify and/or track the information assets that it contains.

In some examples, identification module 104 may identify a data collection as part of a system that manages a global metadata repository (e.g., a repository of information-asset and/or data collection metadata that may be contributed to and/or accessed by one or more data management systems). In these examples, identification module 104 may identify a data collection by receiving information about the data collection and/or the information assets contained within the data collection from one or more data management systems. For example, identification module 104 may identify a data collection by receiving, from one or more data management systems, information that identifies the data collection and or information that identifies each information asset contained within the data collection. In another example, identification module 104 may identify a data collection by querying the global metadata repository.

In some examples, identification module 104 may identify a data collection by enabling an administrator to define the data collection. In at least one example, identification module 104 may identify a data collection as part of enabling an administrator to define a data management policy associated with the data collection.

At step 404, one or more of the systems described herein may identify a classification for each of two or more of the information assets included in the data collection identified at step 402. For example, classification module 106 may, as part of computing device 202 in FIG. 2, identify classifications 206 that include a classification of each of two or more of the information assets included in collection 204 (e.g., two or more of classifications 510, 512, and 514).

Figure 11:
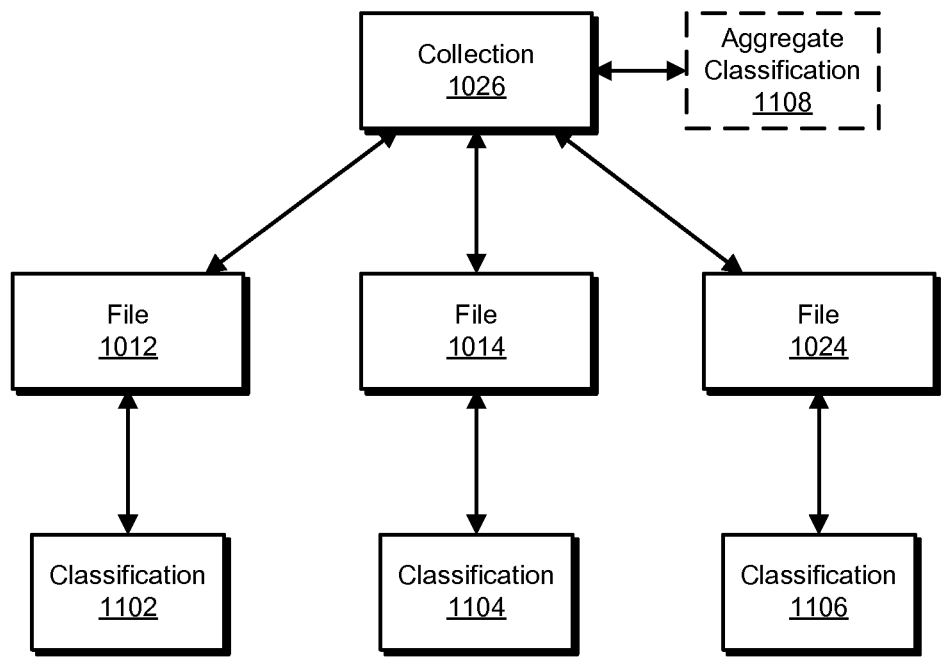
FIG. 11 is a block diagram of an exemplary data collection and associated classifications.
Figure 13:
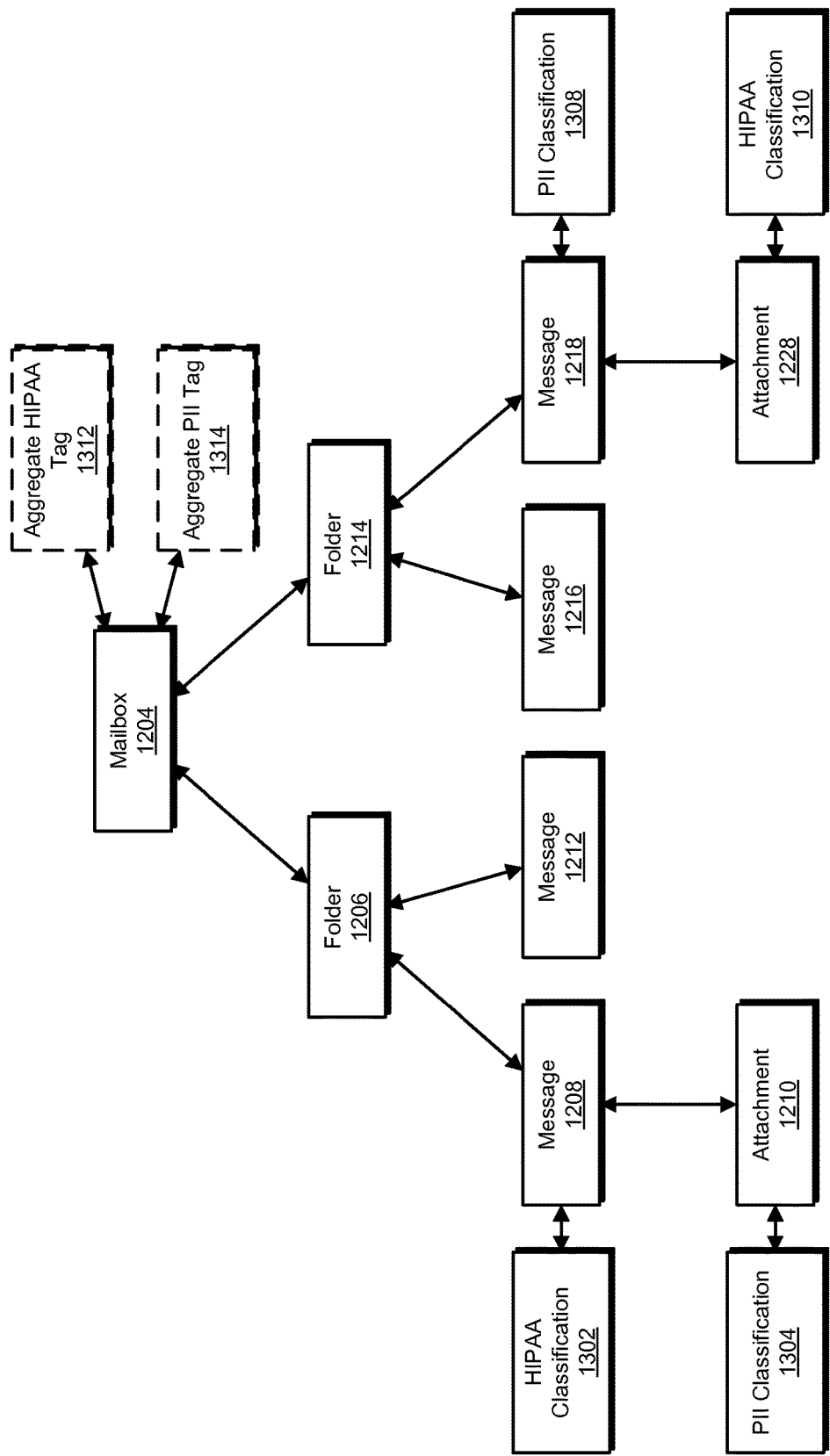
FIG. 13 is a block diagram of an exemplary data collection and associated classifications.
Figure 15:
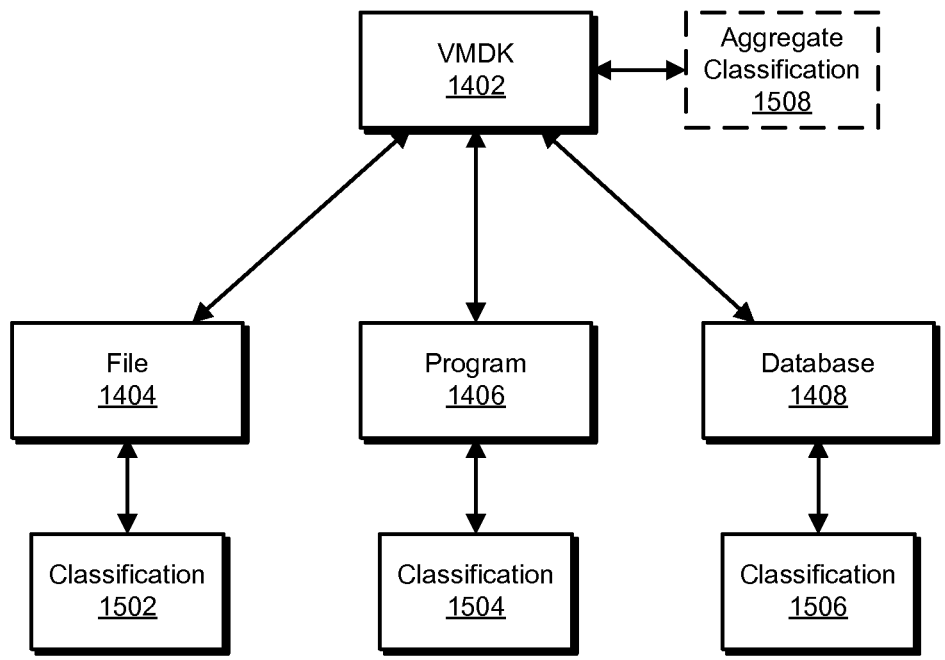
FIG. 15 is a block diagram of an exemplary data collection and associated classifications.

In other examples, classification module 106 may identify a classification for each of two or more of the information assets included in collection 902 in FIG. 9, collection 1026 in FIG. 10, mailbox 1204 in FIG. 12, and/or virtual machine disk file (VMDK) 1402 in FIG. 14. For example, as shown in FIG. 9, classification module 106 may identify classifications 914, 916, 918, 920, and 922 of information asset 904, information asset 906, collection 908, information asset 910, and information asset 912, respectively. As shown in FIG. 11, classification module 106 may identify classifications 1102, 1104, and 1106 of files 1012, 1014, and 1024, respectively. As shown in FIG. 13, classification module 106 may identify HIPAA classification 1302, PII classification 1304, PII classification 1308, and HIPAA classification 1310 of message 1208, attachment 1210, message 1215, and attachment 1228, respectively. As shown in FIG. 15, classification module 106 may identify classification 1502, 1504, and 1506 of file 1404, program 1406, and database 1408, respectively.

As used herein, the term "classification" generally refers to any assessment, categorization, or description of an information asset that is based on the content, format, characteristics, properties, ownership, or other attributes of the information asset. In some examples, a classification of an information asset may be represented by a value within a classification range or scale (e.g., a numeric range or scale). In another example, a classification of an information asset may be represented by one of a set of discrete classifications (e.g. sensitive or non-sensitive). In other examples, a classification of an information asset may be represented by a tag or a label that reflects the classification. For example, a classification of an information asset may include a tag that indicates that the information asset contains personally identifiable information (PII) or financial data and/or a tag that indicates that the information asset complies with a particular regulation (e.g., the Health Insurance Portability and Accountability Act (HIPAA)).

Returning to FIG. 4, classification module 106 may identify the classifications of the information assets included within a data collection in a variety of ways. In one example, classification module 106 may identify a classification of an information asset by generating the classification of the information asset. For example, classification module 106 may, as part of a data management system, generate a classification of an information asset by scanning various attributes of the information asset. Using FIG. 5 as an example, classification module 106 may generate classification 510 by scanning information asset 504.

In another example, classification module 106 may identify the classifications of the information assets included within a data collection by receiving the classifications from the data management systems that generated the classifications. For example, classification module 106 may, as part of a system that manages a global metadata repository, receive a classification of an information asset from a data management system that contributes information about the information asset to the global metadata repository. In another example, classification module 106 may identify the classifications of the information assets included within a data collection by querying the global metadata repository.

In at least one example, classification module 106 may identify the classifications of the information assets included within a data collection by receiving a portion of the classifications from two separate and distinct data management systems. Using FIGS. 3 and 5 as an example, classification module 106 may identify classifications 510-514 by receiving (1) classification 510 from data management system 306(A) and (2) classifications 512 and 514 from data management system 306(B). In this example, data management system 306(A) may have generated classification 510 by scanning information asset 504, and data management system 306(B) may have generated classifications 512 and 514 by scanning information assets 506 and 508, respectively.

Returning to FIG. 4, at step 406 one or more of the systems described herein may derive an aggregate classification for the data collection identified at step 402 based on the classifications of the two or more of the information assets included in the data collection. For example, aggregation module 108 may, as part of computing device 202 in FIG. 2, derive aggregate classification 208 for collection 204 based on two or more of classifications 510, 512, and 514 in FIG. 5.

In other examples, aggregation module 108 may derive an aggregate classification for collection 902 in FIG. 9, collection 1026 in FIG. 10, mailbox 1204 in FIG. 12, and/or virtual machine disk file (VMDK) 1402 in FIG. 14. For example, as shown in FIG. 9, aggregation module 108 may derive an aggregate classification 924 for collection 902 based on classifications 914, 916, 918, 920, and/or 922. As shown in FIG. 11, aggregation module 108 may derive an aggregate classification 1108 for collection 1026 based on classifications 1102, 1104, and 1106. As shown in FIG. 13, aggregation module 108 may derive aggregate classification tags 1312 and 1314 for mailbox 1204 based on HIPAA classification 1302, PII classification 1304, PII classification 1308, and HIPAA classification 1310. As shown in FIG. 15, aggregation module 108 may derive an aggregate classification 1508 for VMDK 1402 based on classification 1502, 1504, and 1506.

Aggregation module 108 may derive an aggregate classification for a data collection in a variety of ways. In one example, aggregation module 108 may derive an aggregate classification for a data collection by compiling a union of the classifications of all or a portion of the information assets included in the data collection. For example, as illustrated in FIG. 13, aggregation module 108 may derive an aggregate classification for mailbox 1204 that includes aggregate HIPAA tag 1312 and aggregate PII tag 1314 by compiling a union of the classification tags assigned to the information assets included in mailbox 1204, namely HIPAA classification 1302, PII classification 1304, PII classification 1308, and HIPAA classification 1310.

In some examples, if the classifications of the information assets included in a data collection are summable, aggregation module 108 may derive an aggregate classification for the data collection by summing the classifications of all or a portion of the information assets included in the data collection. In other examples, if the classifications of the information assets included in a data collection are from a discrete set of classifications, aggregation module 108 may derive an aggregate classification for the data collection by deriving a distribution of the classifications of all or a portion of the information assets included in the data collection.

In some examples, if the classifications of the information assets included in a data collection are numerical values, aggregation module 108 may derive an aggregate classification for the data collection by identifying a maximum, minimum, average, or median value of the classifications of all or a portion of the information assets included in the data collection. For example, as depicted in FIG. 9, aggregation module 108 may derive aggregate classification 924 by identifying a maximum value from classification 914, classification 916, classification 920, and classification 922.

In at least one example, aggregation module 108 may derive an aggregate classification for a data collection based on a classification policy. For example, aggregation module 108 may derive an aggregate classification for a data collection based on a classification policy that indicates that a particular data-collection classification should be assigned to the data collection if a predetermined number of the information assets included in the data collection have a particular information-asset classification.

In addition to or as an alternative to deriving initial aggregate classifications for a data collection, aggregation module 108 may periodically update the aggregate classifications of a data collection based on changes to the data collection and/or changes to the classifications of the information assets included in the data collection. For at least this reason, classification module 106 and/or aggregation module 108 may monitor changes to the data collection and/or changes to the classifications of the information assets included in the data collection.

Figure 6:
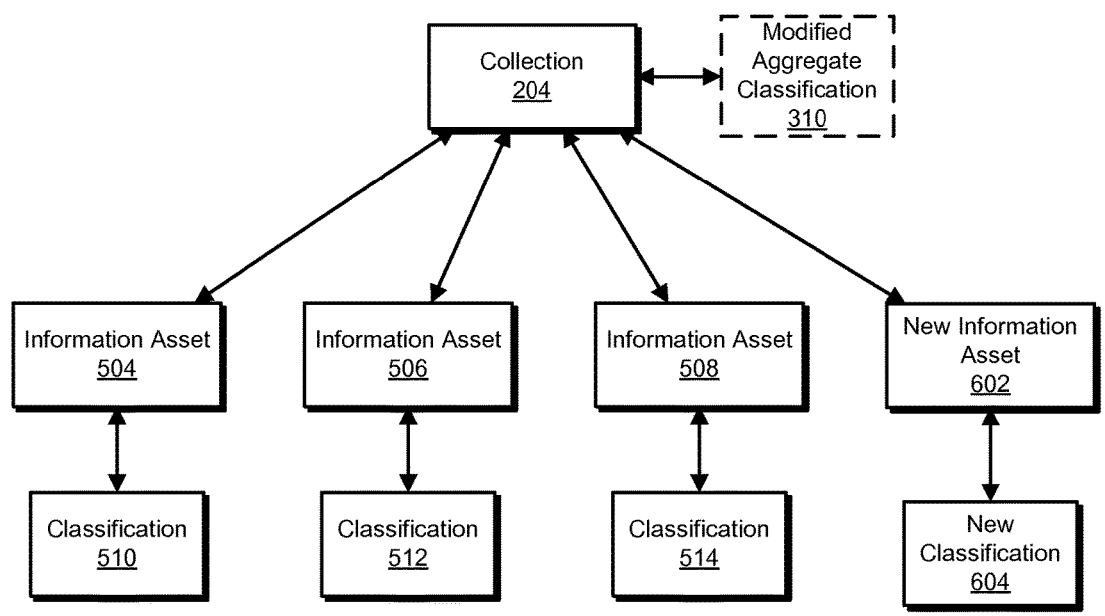
FIG. 6 is a block diagram of an exemplary data collection and associated classifications.

In some examples, classification module 106 and/or aggregation module 108 may monitor changes to data collections and/or changes to classifications of information assets by receiving notifications of changes to the data collections and/or the classifications. In some examples, classification module 106 and/or aggregation module 108 may receive a notification when a data management system changes the classification of one of the information assets included in the data collection, when the data management system deletes or detects a deletion of one of the information assets included in the data collection, and/or when the data management system includes or detects an inclusion of an additional information asset to the data collection. In response to receiving such notifications, aggregation module 108 may modify the aggregate classification of the data collection Using FIG. 3 as an example, classification module 106 may, as part of server 302, receive change notification 308 informing classification module 106 of a change to collection 204 and/or a classification change to an information asset included in collection 204. In this example, classification module 106 may receive change notification 308 from one of data management systems 306(A) or 306(B). In response to change notification 308, aggregation module 108 may derive modified aggregate classification 310 for collection 204. Using FIGS. 5 and 6 as an example, change notification 308 may have indicated that a new information asset was added to collection 204 as shown in FIG. 5. For example, change notification 308 may indicate that new information asset 602 with new classification 604 was added to collection 204 as shown in FIG. 6. In this example, aggregation module 108 may derive modified aggregate classification 310 based on classifications 510, 512, 514, and new classification 604.

Figure 7:
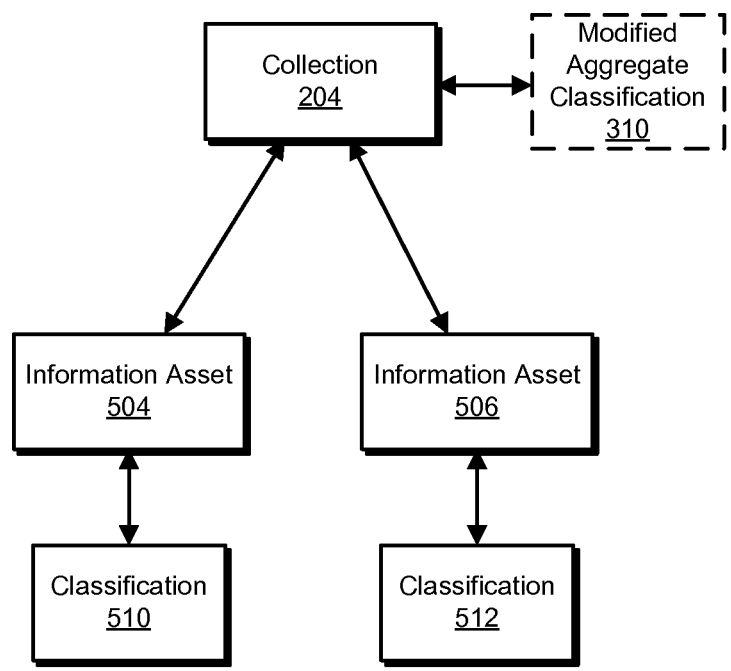
FIG. 7 is a block diagram of an exemplary data collection and associated classifications.
Figure 8:
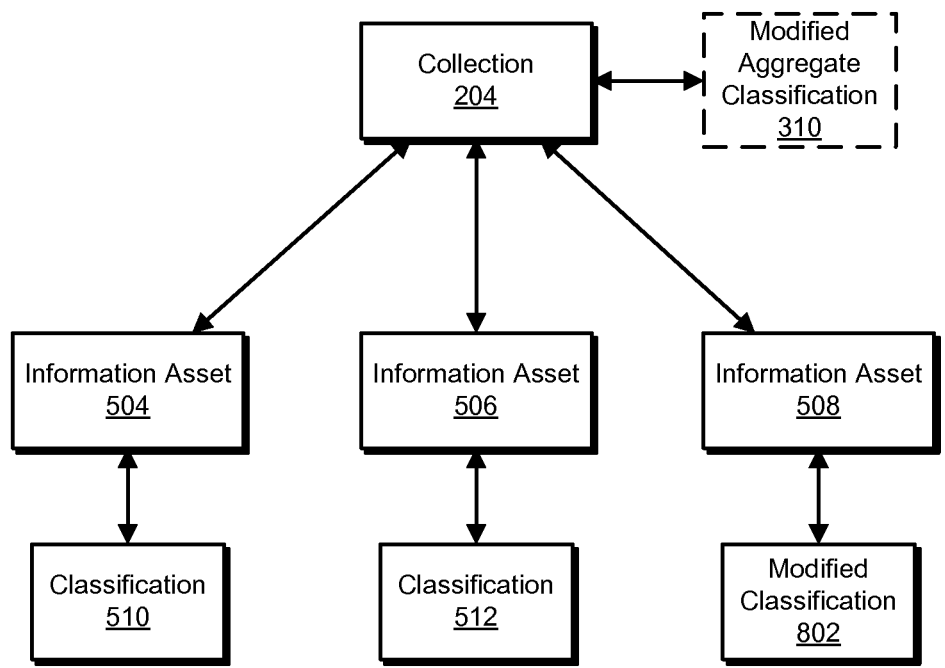
FIG. 8 is a block diagram of an exemplary data collection and associated classifications.

Using FIGS. 5 and 7 as another example, change notification 308 may have indicated that information asset 508 as shown in FIG. 5 was deleted from collection 204 as shown in FIG. 7. In this example, aggregation module 108 may derive modified aggregate classification 310 based on classifications 510 and 512. Using FIGS. 5 and 8 as yet another example, change notification 308 may have indicated that classification 514 of information asset 508 as shown in FIG. 5 was changed to modified classification 802 as shown in FIG. 8. In this example, aggregation module 108 may derive modified aggregate classification 310 based on classifications 510 and 512 and modified classification 802.

In some instances, a data collection may include one or more subordinate data collections. For example, as shown in FIG. 9 collection 902 may include subordinate collection 908. In one example, aggregation module 108 may derive an aggregate classification for a data collection that includes a subordinate data collection based on the aggregate classification associated with the subordinate data collection. Using FIG. 9 as an example, aggregation module 108 may derive aggregate classification 924 based on aggregate classification 918 of collection 908. In this example, aggregation module 108 may update aggregate classification 924 in response to a change to aggregate classification 918 or collection 908.

Additionally or alternatively, aggregation module 108 may derive an aggregate classification for a data collection that includes a subordinate data collection based on the classifications associated with the information assets included in the subordinate data collection. Using FIG. 9 as an example, aggregation module 108 may derive aggregate classification 924 using classifications 920 and 922. In this example, aggregation module 108 may update aggregate classification 924 in response to a change to classification 920, classification 922, or collection 908.

Returning to FIG. 4, at step 408, one or more of the systems described herein may associate the aggregate classification derived at step 406 with the data collection identified at step 402 to enable a data management system to enforce a data management policy based on the aggregate classification. For example, association module 110 may, as part of computing device 202 in FIG. 2, associate aggregate classification 208 with collection 204 to enable a data management system to enforce a data management policy based on aggregate classification 208.

Association module 110 may associate an aggregate classification with a data collection in any suitable manner. For example, association module 110 may store an aggregate classification of a data collection as metadata associated with the data collection. In at least one example, association module 110 may store an aggregate classification of a data collection to a global metadata repository that may be accessed by one or more data management systems. Upon completion of step 408, exemplary method 400 in FIG. 4 may terminate.

In some examples, one or more of the systems described herein may provide access to aggregate classifications. For example, server 302 may, as part of a system that manages a global metadata repository, provide access to aggregate classifications to data management system 306(A) and/or 306(B).

In some examples, one or more of the systems described herein may enforce a data management policy based on an aggregate classification of a data collection. For example, policy module 112 may, as part of computing device 202 in FIG. 2 or as part of one of data management systems 306(A) and 306(B) in FIG. 3, (1) identify a data management policy based on an aggregate classification for collection 204 and (2) enforce the data management policy based on aggregate classification 208. As used herein, the term "data management policy" generally refers to instructions and/or courses of action to be taken that are based on an aggregate classification derived for a data collection. Examples of data management policies include, without limitation, backup-schedule policies, backup-location policies, archive policies, retention policies, disposal policies, security policies, and ownership policies.

As described above, by aggregating the potentially differing classifications of the information assets that are included in a data collection into a single aggregate classification for the data collection, the systems and methods described herein may enable a data management system to define and/or enforce a data management policy using collection-level classifications. Moreover, by using information generated by and received from one or more separate and distinct data management systems to track what information assets are included in a data collection and how the information assets are classified, the systems and methods described herein may generate an aggregate classification for the data collection without having to independently scan the data collection or classify some or all of its information assets.

For example, the systems describe herein may receive, from disparate data management systems, information about a data collection, the information assets included within the data collection, and classifications of the information assets. The systems describe herein may then (1) derive a single aggregate classification for the data collection based on the classifications of the information assets and/or (2) provide access to the aggregate classification to the disparate data management systems such that the disparate data management systems can enforce data management policies using the aggregate classification. Additionally, the systems described herein may (1) monitor changes to the data collection, the information assets included within the data collection, and the classifications of the information assets and (2) update the aggregate classification of the data collection accordingly.

Figure 16:
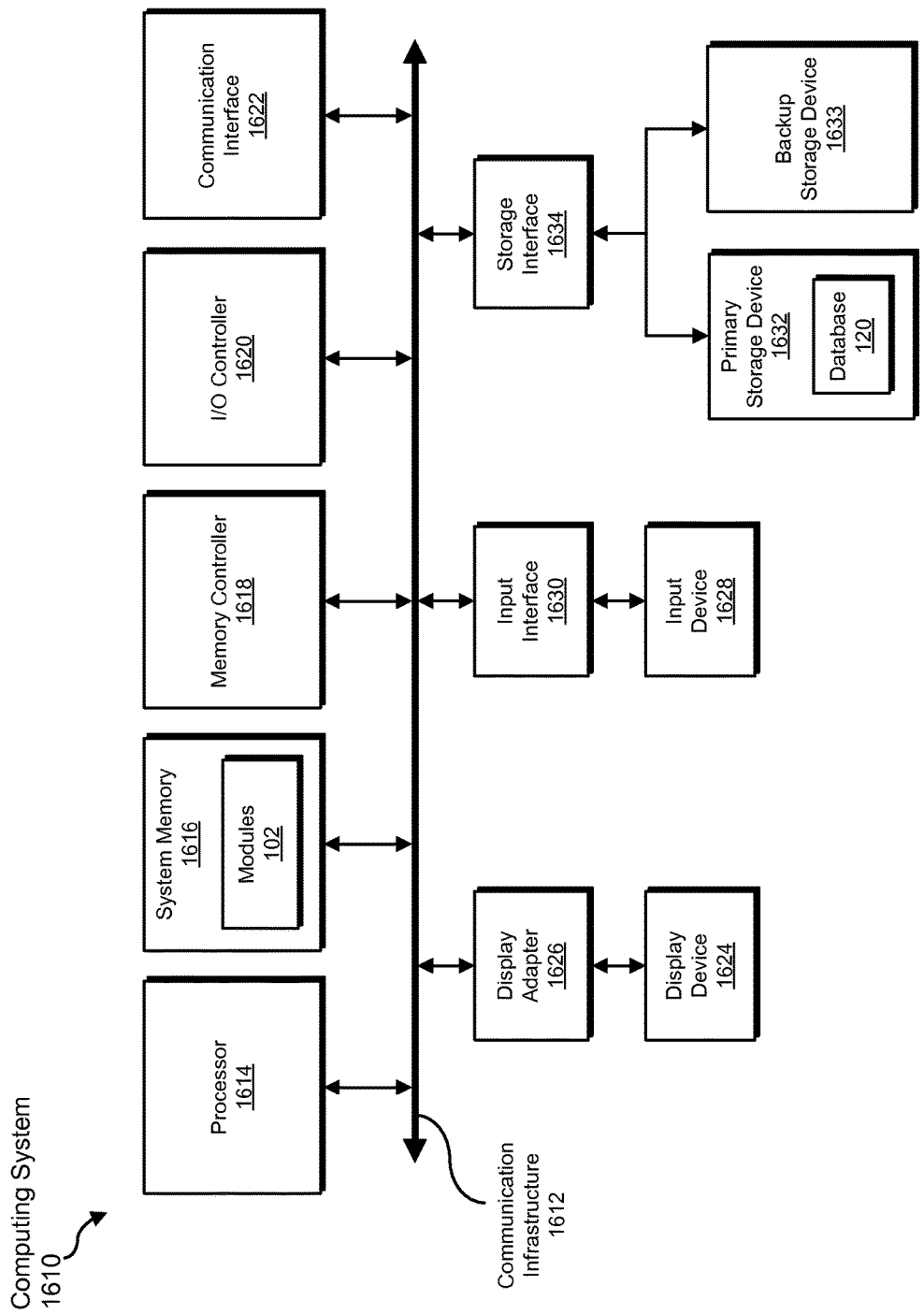
FIG. 16 is a block diagram of an exemplary computing system capable of implementing one or more of the embodiments described and/or illustrated herein.

FIG. 16 is a block diagram of an exemplary computing system 1610 capable of implementing one or more of the embodiments described and/or illustrated herein. For example, all or a portion of computing system 1610 may perform and/or be a means for performing, either alone or in combination with other elements, one or more of the steps described herein (such as one or more of the steps illustrated in FIG. 4). All or a portion of computing system 1610 may also perform and/or be a means for performing any other steps, methods, or processes described and/or illustrated herein.

Computing system 1610 broadly represents any single or multi-processor computing device or system capable of executing computer-readable instructions. Examples of computing system 1610 include, without limitation, workstations, laptops, client-side terminals, servers, distributed computing systems, handheld devices, or any other computing system or device. In its most basic configuration, computing system 1610 may include at least one processor 1614 and a system memory 1616.

Processor 1614 generally represents any type or form of physical processing unit (e.g., a hardware-implemented central processing unit) capable of processing data or interpreting and executing instructions. In certain embodiments, processor 1614 may receive instructions from a software application or module. These instructions may cause processor 1614 to perform the functions of one or more of the exemplary embodiments described and/or illustrated herein.

System memory 1616 generally represents any type or form of volatile or non-volatile storage device or medium capable of storing data and/or other computer-readable instructions. Examples of system memory 1616 include, without limitation, Random Access Memory (RAM), Read Only Memory (ROM), flash memory, or any other suitable memory device. Although not required, in certain embodiments computing system 1610 may include both a volatile memory unit (such as, for example, system memory 1616) and a non-volatile storage device (such as, for example, primary storage device 1632, as described in detail below). In one example, one or more of modules 102 from FIG. 1 may be loaded into system memory 1616.

In certain embodiments, exemplary computing system 1610 may also include one or more components or elements in addition to processor 1614 and system memory 1616. For example, as illustrated in FIG. 16, computing system 1610 may include a memory controller 1618, an Input/Output (I/O) controller 1620, and a communication interface 1622, each of which may be interconnected via a communication infrastructure 1612. Communication infrastructure 1612 generally represents any type or form of infrastructure capable of facilitating communication between one or more components of a computing device. Examples of communication infrastructure 1612 include, without limitation, a communication bus (such as an Industry Standard Architecture (ISA), Peripheral Component Interconnect (PCI), PCI Express (PCIe), or similar bus) and a network.

Memory controller 1618 generally represents any type or form of device capable of handling memory or data or controlling communication between one or more components of computing system 1610. For example, in certain embodiments memory controller 1618 may control communication between processor 1614, system memory 1616, and I/O controller 1620 via communication infrastructure 1612.

I/O controller 1620 generally represents any type or form of module capable of coordinating and/or controlling the input and output functions of a computing device. For example, in certain embodiments I/O controller 1620 may control or facilitate transfer of data between one or more elements of computing system 1610, such as processor 1614, system memory 1616, communication interface 1622, display adapter 1626, input interface 1630, and storage interface 1634.

Communication interface 1622 broadly represents any type or form of communication device or adapter capable of facilitating communication between exemplary computing system 1610 and one or more additional devices. For example, in certain embodiments communication interface 1622 may facilitate communication between computing system 1610 and a private or public network including additional computing systems. Examples of communication interface 1622 include, without limitation, a wired network interface (such as a network interface card), a wireless network interface (such as a wireless network interface card), a modem, and any other suitable interface. In at least one embodiment, communication interface 1622 may provide a direct connection to a remote server via a direct link to a network, such as the Internet. Communication interface 1622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1622 may also represent a host adapter configured to facilitate communication between computing system 1610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1622 may also allow computing system 1610 to engage in distributed or remote computing. For example, communication interface 1622 may receive instructions from a remote device or send instructions to a remote device for execution.

As illustrated in FIG. 16, computing system 1610 may also include at least one display device 1624 coupled to communication infrastructure 1612 via a display adapter 1626. Display device 1624 generally represents any type or form of device capable of visually displaying information forwarded by display adapter 1626. Similarly, display adapter 1626 generally represents any type or form of device configured to forward graphics, text, and other data from communication infrastructure 1612 (or from a frame buffer, as known in the art) for display on display device 1624.

As illustrated in FIG. 16, exemplary computing system 1610 may also include at least one input device 1628 coupled to communication infrastructure 1612 via an input interface 1630. Input device 1628 generally represents any type or form of input device capable of providing input, either computer or human generated, to exemplary computing system 1610. Examples of input device 1628 include, without limitation, a keyboard, a pointing device, a speech recognition device, or any other input device.

As illustrated in FIG. 16, exemplary computing system 1610 may also include a primary storage device 1632 and a backup storage device 1633 coupled to communication infrastructure 1612 via a storage interface 1634. Storage devices 1632 and 1633 generally represent any type or form of storage device or medium capable of storing data and/or other computer-readable instructions. For example, storage devices 1632 and 1633 may be a magnetic disk drive (e.g., a so-called hard drive), a solid state drive, a floppy disk drive, a magnetic tape drive, an optical disk drive, a flash drive, or the like. Storage interface 1634 generally represents any type or form of interface or device for transferring data between storage devices 1632 and 1633 and other components of computing system 1610. In one example, database 120 from FIG. 1 may be stored in primary storage device 1632.

In certain embodiments, storage devices 1632 and 1633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1632 and 1633 may also include other similar structures or devices for allowing computer software, data, or other computer-readable instructions to be loaded into computing system 1610. For example, storage devices 1632 and 1633 may be configured to read and write software, data, or other computer-readable information. Storage devices 1632 and 1633 may also be a part of computing system 1610 or may be a separate device accessed through other interface systems.

Many other devices or subsystems may be connected to computing system 1610. Conversely, all of the components and devices illustrated in FIG. 16 need not be present to practice the embodiments described and/or illustrated herein. The devices and subsystems referenced above may also be interconnected in different ways from that shown in FIG. 16. Computing system 1610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1610. All or a portion of the computer program stored on the computer-readable medium may then be stored in system memory 1616 and/or various portions of storage devices 1632 and 1633. When executed by processor 1614, a computer program loaded into computing system 1610 may cause processor 1614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1610 may be configured as an Application Specific Integrated Circuit (ASIC) adapted to implement one or more of the exemplary embodiments disclosed herein.

Figure 17:
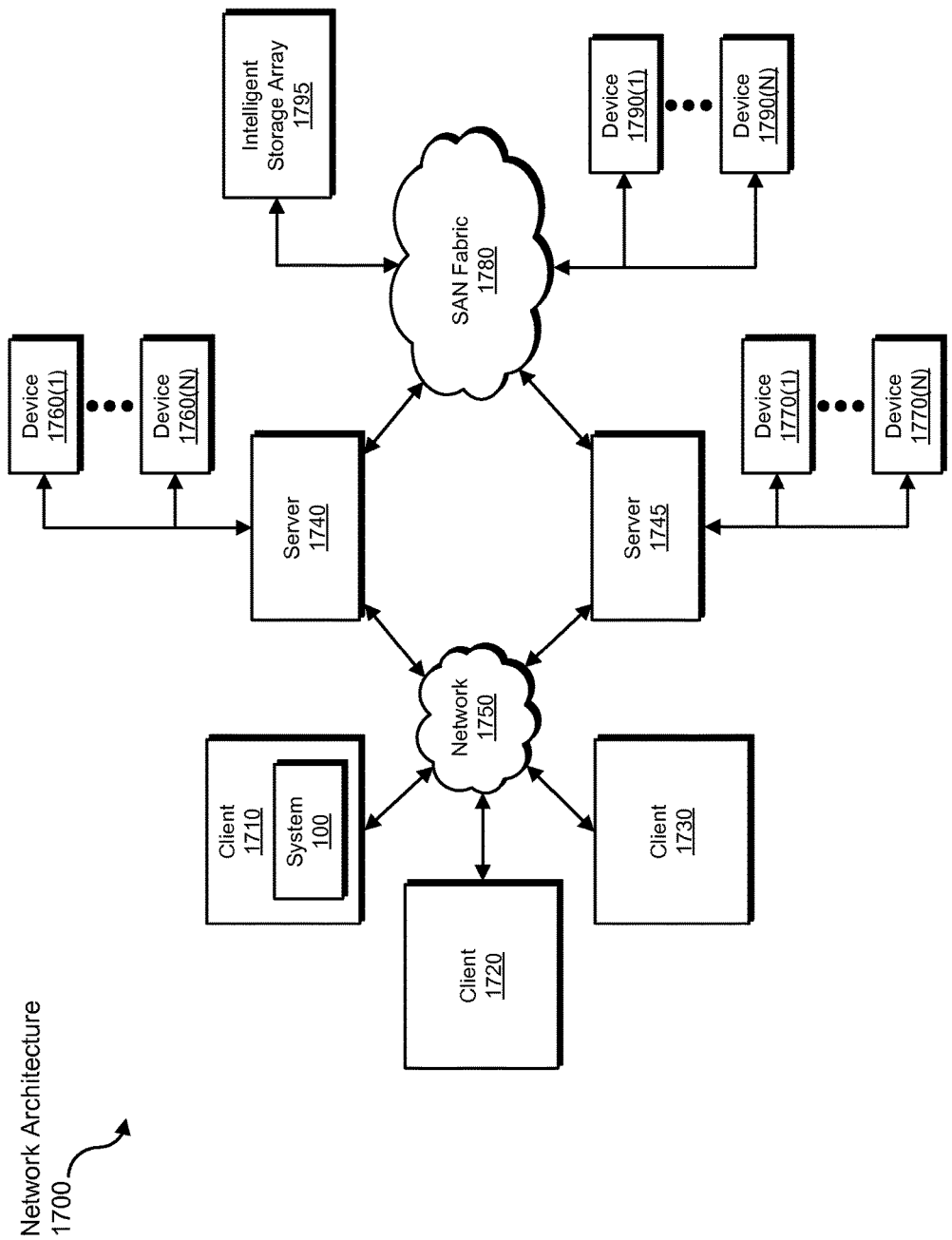
FIG. 17 is a block diagram of an exemplary computing network capable of implementing one or more of the embodiments described and/or illustrated herein.

FIG. 17 is a block diagram of an exemplary network architecture 1700 in which client systems 1710, 1720, and 1730 and servers 1740 and 1745 may be coupled to a network 1750. As detailed above, all or a portion of network architecture 1700 may perform and/or be a means for performing, either alone or in combination with other elements, one or more of the steps disclosed herein (such as one or more of the steps illustrated in FIG. 4). All or a portion of network architecture 1700 may also be used to perform and/or be a means for performing other steps and features set forth in the instant disclosure.

Client systems 1710, 1720, and 1730 generally represent any type or form of computing device or system, such as exemplary computing system 1610 in FIG. 16. Similarly, servers 1740 and 1745 generally represent computing devices or systems, such as application servers or database servers, configured to provide various database services and/or run certain software applications. Network 1750 generally represents any telecommunication or computer network including, for example, an intranet, a WAN, a LAN, a PAN, or the Internet. In one example, client systems 1710, 1720, and/or 1730 and/or servers 1740 and/or 1745 may include all or a portion of system 100 from FIG. 1.

As illustrated in FIG. 17, one or more storage devices 1760(1)-(N) may be directly attached to server 1740. Similarly, one or more storage devices 1770(1)-(N) may be directly attached to server 1745. Storage devices 1760(1)-(N) and storage devices 1770(1)-(N) generally represent any type or form of storage device or medium capable of storing data and/or other computer-readable instructions. In certain embodiments, storage devices 1760(1)-(N) and storage devices 1770(1)-(N) may represent Network-Attached Storage (NAS) devices configured to communicate with servers 1740 and 1745 using various protocols, such as Network File System (NFS), Server Message Block (SMB), or Common Internet File System (CIFS).

Servers 1740 and 1745 may also be connected to a Storage Area Network (SAN) fabric 1780. SAN fabric 1780 generally represents any type or form of computer network or architecture capable of facilitating communication between a plurality of storage devices. SAN fabric 1780 may facilitate communication between servers 1740 and 1745 and a plurality of storage devices 1790(1)-(N) and/or an intelligent storage array 1795. SAN fabric 1780 may also facilitate, via network 1750 and servers 1740 and 1745, communication between client systems 1710, 1720, and 1730 and storage devices 1790(1)-(N) and/or intelligent storage array 1795 in such a manner that devices 1790(1)-

(N) and array 1795 appear as locally attached devices to client systems 1710, 1720, and 1730. As with storage devices 1760(1)-(N) and storage devices 1770(1)-(N), storage devices 1790(1)-(N) and intelligent storage array 1795 generally represent any type or form of storage device or medium capable of storing data and/or other computer-readable instructions.

In certain embodiments, and with reference to exemplary computing system 1610 of FIG. 16, a communication interface, such as communication interface 1622 in FIG. 16, may be used to provide connectivity between each client system 1710, 1720, and 1730 and network 1750. Client systems 1710, 1720, and 1730 may be able to access information on server 1740 or 1745 using, for example, a web browser or other client software. Such software may allow client systems 1710, 1720, and 1730 to access data hosted by server 1740, server 1745, storage devices 1760(1)-(N), storage devices 1770(1)-(N), storage devices 1790(1)-(N), or intelligent storage array 1795. Although FIG. 17 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1740, server 1745, storage devices 1760(1)-(N), storage devices 1770(1)-(N), storage devices 1790(1)-(N), intelligent storage array 1795, or any combination thereof. All or a portion of one or more of the exemplary embodiments disclosed herein may also be encoded as a computer program, stored in server 1740, run by server 1745, and distributed to client systems 1710, 1720, and 1730 over network 1750.

As detailed above, computing system 1610 and/or one or more components of network architecture 1700 may perform and/or be a means for performing, either alone or in combination with other elements, one or more steps of an exemplary method for aggregating information-asset classifications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive classifications of the information assets contained within a data collection to be transformed, transform the classifications into an aggregate classification for the data collection, output a result of the transformation to a system that enforces data management policies based on aggregate classifications of data collections, use the result of the transformation to enforce a data management policy associated with the data collection, and store the result of the transformation to facilitate selection and/or enforcement of data management policies. One or more of the modules described herein may transform a computing system into a system for aggregating information-asset classifications. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for aggregating information-asset classifications, at least a portion of the method being performed by a computing device comprising at least one processor, the method comprising:
   identifying a file system folder that includes a plurality of files;
   identifying a classification for each of two or more of the files within the file system folder;
   deriving, based at least in part on the classifications of the two or more of the files, an aggregate classification for the file system folder that contains the plurality of files;
   assigning the aggregate classification to the file system folder to enable a data management system to enforce a collection-level data management policy based on the aggregate classification for the file system folder;
   enforcing, by a system for endpoint security, the collection-level data management policy by taking, after the aggregate classification is assigned to the file system folder, and in accordance with a security policy, course of action based at least in part on the aggregate classification of the file system folder to protect an endpoint computing device from unauthorized access.

2. The computer-implemented method of claim 1, wherein:
   deriving the aggregate classification comprises compiling a union of the classifications of the two or more of the files;
   the aggregate classification comprises the union of the classifications of the two or more of the files.

3. The computer-implemented method of claim 1, wherein:
   deriving the aggregate classification comprises identifying a maximum value of the classifications of the two or more of the files;
   the aggregate classification comprises the maximum value of the two or more of the files.

4. The computer-implemented method of claim 1, wherein:
   deriving the aggregate classification comprises calculating an average value of the classifications of the two or more of the files;
   the aggregate classification comprises the average value of the classifications of the two or more of the files.

5. The computer-implemented method of claim 1, wherein:
   deriving the aggregate classification comprises identifying a minimum value of the classifications of the two or more of the files;

the aggregate classification comprises the minimum value of the classifications of the two or more of the files.

6. The computer-implemented method of claim 1, further comprising:
receiving a notification of a change to the file system folder, wherein the change comprises at least one of:
a change to the classification of one of the files included in the file system folder;
deletion of one of the files included in the file system folder;
inclusion of an additional file to the file system folder;
modifying the aggregate classification of the file system folder based on the change to the file system folder.

7. The computer-implemented method of claim 1, further comprising:
receiving a request for the aggregate classification for the file system folder;
in response to receiving the request for the aggregate classification, providing the aggregate classification for the file system folder.

8. The computer-implemented method of claim 1, wherein the file system folder comprises a container of the plurality of files.

9. The computer-implemented method of claim 1, wherein at least one of the files comprises a file capable of containing at least one additional file.

10. The computer-implemented method of claim 1, wherein deriving the aggregate classification for the file system folder is based at least in part on a classification of at least one subordinate file system folder contained in the file system folder.

11. The computer-implemented method of claim 1, wherein deriving the aggregate classification for the file system folder is based at least in part on a classification of at least one file contained in a subordinate file system folder contained in the file system folder.

12. The computer-implemented method of claim 1, wherein the classifications for the two or more of the files are received from two separate and distinct data management systems.

13. A system for aggregating information-asset classifications and endpoint security, the system comprising:
an identification module, stored in memory, that identifies a file system folder that includes a plurality of files;
a classification module, stored in memory, that identifies a classification for each of two or more of the files within the file system folder;
an aggregation module, stored in memory, that derives, based at least in part on the classifications of the two or more of the files, an aggregate classification for the file system folder that contains the plurality of files;
an association module, stored in memory, that assigns the aggregate classification to the file system folder to enable a data management system to enforce a collection-level data management policy based on the aggregate classification for the file system folder;
a policy module, stored in memory, that enforces, as part of the system for endpoint security, the collection-level data management policy by taking, after the aggregate classification is assigned to the file system folder and in accordance with a security policy, course of action based at least in part on the aggregate classification of the file system folder to protect an endpoint computing device from unauthorized access;

at least one physical processor configured to execute the identification module, the classification module, the aggregation module, the association module, and the policy module.

14. The system of claim 13, wherein:
the aggregation module derives the aggregate classification by compiling a union of the classifications of the two or more of the files;
the aggregate classification comprises the union of the classifications of the two or more of the files.

15. The system of claim 13, wherein the aggregation module derives the aggregate classification by identifying a maximum value of the classifications of the files included in the file system folder.

16. The system of claim 13, wherein the aggregation module derives the aggregate classification by calculating an average value of the classifications of the files included in the file system folder.

17. The system of claim 13, wherein the aggregation module derives the aggregate classification by identifying a minimum value of the classifications of the files included in the file system folder.

18. The system of claim 13, wherein:
the classification module further receives a notification of a change to the file system folder, wherein the change comprises at least one of:
a change to the classification of one of the files included in the file system folder;
deletion of one of the files included in the file system folder;
inclusion of an additional file to the file system folder;
the aggregation module further modifies the aggregate classification of the file system folder based on the change to the file system folder.

19. The system of claim 13, wherein the association module further:
receives a request for the aggregate classification for the file system folder;
provides the aggregate classification for the file system folder in response to receiving the request for the aggregate classification.

20. A non-transitory computer-readable medium comprising one or more computer-readable instructions that, when executed by at least one processor of a computing device, cause the computing device to:
identify a file system folder that includes a plurality of files;
identify a classification for each of two or more of the files within the file system folder;
derive, based at least in part on the classifications of the two or more of the files an aggregate classification for the file system folder that contains the plurality of files;
assign the aggregate classification to the file system folder to enable a data management system to enforce a collection-level data management policy based on the aggregate classification for the file system folder;
enforce, by a system for endpoint security, the collection-level data management policy by taking, after the aggregate classification is assigned to the file system folder, and in accordance with a security policy, a course of action based at least in part on the aggregate classification of the file system folder to protect an endpoint computing device from unauthorized access.

* * * * *